H. F. PORTER.
HANDLE.
APPLICATION FILED JAN. 27, 1920.
1,362,506.
Patented Dec. 14, 1920.
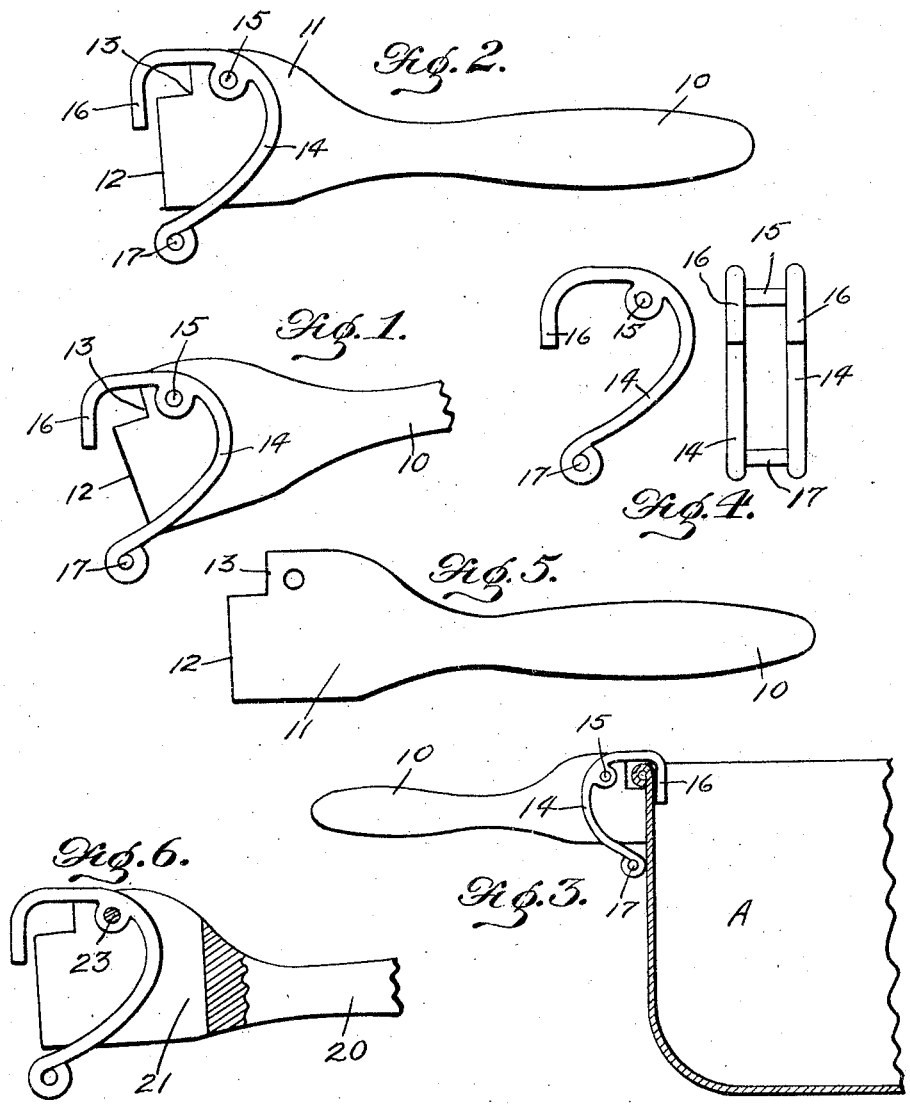
Witnesses
Joseph A. Balster
Edward Geiger
Inventor
Henry F. Porter
By Victor J. Evans
Attorney.

UNITED STATES PATENT OFFICE.

HENRY F. PORTER, OF SEAFORD, DELAWARE.

HANDLE.

1,362,506.  Specification of Letters Patent.  Patented Dec. 14, 1920.

Application filed January 27, 1920. Serial No. 354,470.

*To all whom it may concern:*

Be it known that I, HENRY F. PORTER, a citizen of the United States, residing at Seaford, in the county of Sussex and State of Delaware, have invented new and useful Improvements in Handles, of which the following is a specification.

This invention comprehends the provision of a device designed for handling baking pans, pots, or the like, which may be hot or soiled necessitating the use of some means to preserve the hands when lifting such articles or carrying the same from place to place.

In carrying out the invention I make use of a handle which pivotally supports a yoke designed to be readily and easily applied to the article to be lifted, the yoke coöperated with the handle to obtain an effective purchase upon the article thereby preventing relative movement between the said article and the device when the parts are associated.

It is also my purpose to provide a device of the above mentioned character which is extremely simple in construction and can thus be manufactured and sold at a nominal cost.

The nature and advantages of the invention will be better understood when the following detail description is read in connection with the accompanying drawings, the invention residing in the construction combination and arrangement of parts as claimed.

In the drawing forming part of the specification, like numerals of reference indicate similar parts in the several views and wherein:—

Figure 1 is a view in elevation showing the position of the yoke with respect to the handle described for the application of the device to the article to be lifted.

Fig. 2 is a side elevation showing the normal position of the parts.

Fig. 3 is a view of the device associated with a pan.

Fig. 4 is a detail view of the yoke.

Fig. 5 is a similar view of the handle.

Fig. 6 is a view partly in section of a modified form of the invention.

Referring to the drawings in detail, the device forming the subject matter of my invention embodies a handle 10 which may be of any suitable material and of any desired dimension. The handle 10 is provided with a relatively broad end portion 11 having a straight edge 12, which is cut away as at 13 for a purpose to be hereinafter described. Associated with the broad end portion is a pivoted yoke which coöperates with the straight edge 12 of the handle and obtains an effective purchase upon the pan or other article to be lifted. The yoke as shown in the preferred form of the invention is constructed from wire into substantially U-shaped cross section. The parallel portions 14 are arranged at opposite sides of the handle and are connected together by means of the pivot 15 passed through the opening in the handle immediately at the rear of the cut away portion 13. The portions 14 are curved in the manner illustrated so that the free terminals 16 lie in a vertical plane with the cross piece 17 when the parts are in the position illustrated in Fig. 1. The terminals 16 are bent downwardly at right angles to the members 14 considering the device in the position illustrated in Fig. 1. In the use of the device, the handle 10 is first arranged at an inclination to the article to be lifted, thus allowing the yoke which is freely pivoted upon the handle to assume the position as shown in Fig. 1, in which position the terminals 16 of the yoke can be readily and easily slipped over the upper edge of the pot or article to be lifted indicated at A in Fig. 3. Should the pot or article to be lifted, be provided with an annular flange, bead or the like, it is received within the cut away portion 13, a construction which allows the straight edge 12 to be brought into engagement with the side of the pot or other article indicated at A. The cross piece 17, also contacts the side of the vessel A at a point beneath the handle or straight edge 12 and consequently when the vessel is lifted, the latter is effectively gripped at three points, namely by the terminals 16 on the inside, and by the edge 12 of the handle and the cross piece 17 on the outside. The heavier the object lifted, the more effective is the gripping action of the device. The construction is such, that the device may also be left upon the receptacle A for future use as found necessary.

In Fig. 6 I have disclosed a modified form of the invention wherein the yoke consists of a single element preferably constructed from wire and having a shape similar to one of the side portions 14 of the yoke hereinabove described. In this instance, however, the handle 20 is slotted as at 21, the yoke being pivoted as at 23 within the slot. The device in this form of the invention is otherwise constructed and used in the same manner as hereinabove described with reference to the preferred form.

While it is believed that from the foregoing description, the nature and advantages of the invention will be readily apparent, I desire to have it understood that I do not limit myself in this connection, and that such changes may be resorted to when desired as fall within the scope of what is claimed.

What I claim as new is:—

1. A device of the character described comprising a handle having a relatively broad end portion and a straight edge, a curved member pivoted at a point between its ends upon the handle adjacent the one corner thereof, the terminals of said member being arranged in advance of the handle, in the active position of parts, and one of said terminals being arranged at right angles to the other as and for the purpose specified.

2. A device of the character described comprising a handle having a relatively broad end portion, said end portion being cut away at one corner thereof, a member pivoted upon the handle, immediately at the rear of the cut away portion, said member being curved and having its terminals disposed in advance of the handle in the active position of parts, and one terminal being arranged at right angles to the other as and for the purpose specified.

3. A device of the character described comprising a handle, a yoke straddling the handle and pivotally connected thereto adjacent one corner thereof, the sides of said yoke being curved in a manner whereby the terminals of the yoke are disposed in advance of the handle in the active position of parts, and said handle having one corner cut away as and for the purpose specified.

4. A device of the class described comprising a handle having a slot, a member freely pivoted within the slot, said member being curved and having its ends projecting beyond the end of the handle when in active position, and one terminal of said member being arranged at right angles to the other and said handle having one corner cut away for the purpose specified.

In testimony whereof I affix my signature.

HENRY F. PORTER.